US006629020B1

United States Patent
Thomsen

(10) Patent No.: US 6,629,020 B1
(45) Date of Patent: Sep. 30, 2003

(54) CONTROL DEVICE FOR THE POSITION OF A VALVE SLIDE

(75) Inventor: Flemming Thomsen, Aabenraa (DK)

(73) Assignee: Sauer-Danfoss Holding A/S, Nordborg (DK)

(*) Notice: Subject to any disclaimer, the term of this patent is extended or adjusted under 35 U.S.C. 154(b) by 0 days.

(21) Appl. No.: 09/541,183

(22) Filed: Apr. 3, 2000

(30) Foreign Application Priority Data

Apr. 15, 1999 (DE) ........................................ 199 16 986

(51) Int. Cl.⁷ .............................................. G05D 7/00
(52) U.S. Cl. ........................ 700/282; 700/56; 700/302; 91/361
(58) Field of Search .............................. 700/282, 56, 57, 700/58, 65, 275, 302; 137/51, 54, 614.19; 251/129.05, 129.04; 91/358 R, 359, 364, 365, 390, 361, 459

(56) References Cited

U.S. PATENT DOCUMENTS

| 3,736,845 A | * | 6/1973 | Weiste et al. ............... 91/390 |
| 4,037,519 A | * | 7/1977 | Miller et al. ................ 91/1 |
| 4,416,187 A | * | 11/1983 | Nystrom ..................... 91/361 |
| 4,701,938 A | * | 10/1987 | Bell ........................... 375/257 |
| 4,765,225 A | * | 8/1988 | Birchard ..................... 91/362 |
| 4,870,892 A | * | 10/1989 | Thomsen et al. ............ 91/361 |
| 4,876,531 A | * | 10/1989 | Dondorf ...................... 91/361 |
| 4,937,553 A | * | 6/1990 | Juckenack .................. 340/452 |
| 5,121,042 A | * | 6/1992 | Ako ........................... 318/657 |
| 6,131,500 A | * | 10/2000 | Moncrief ..................... 91/361 |

* cited by examiner

*Primary Examiner*—Leo Picard
*Assistant Examiner*—Paul Rodriguez
(74) *Attorney, Agent, or Firm*—Barnes & Thornburg

(57) ABSTRACT

A control device for the position (x) of a valve slide (3), with a d.c. voltage ($U_B$) operated set point transmitter (11), which produces a set point value ($U_w$) proportional to the position (w) of a control lever (10) and the operating d.c. voltage ($U_B$), with an actual value transmitter (15) operated with the same d.c. voltage ($U_B$) as the set point transmitter (11), which produces an actual value signal ($U_x$) proportional to the position (x) of the valve slide (3) and the operating d.c. voltage ($U_B$), the proportionality factors ($k_1$, $k_2$) being equal to the dependence of the set point and actual value signals ($U_w$, $U_x$) on the position (x) of the valve slide (3) or the position (w) of the control lever (10), respectively, and on the operating d.c. voltage ($U_B$), and with a regulating device (14) having a comparator (12), which regulating device (14) makes the position (x) of the valve slide (3) follow the position (w) of the control lever (10) in dependence of a difference between the set point signal and the actual value signal ($U_w$, $U_x$) detected by the comparator (12). To simplify the embodiment of the control device and to improve its working reliability, the actual value transmitter (15) converts the position (x) of the valve slide (3) touchfree into the actual value signal ($U_x$).

7 Claims, 1 Drawing Sheet

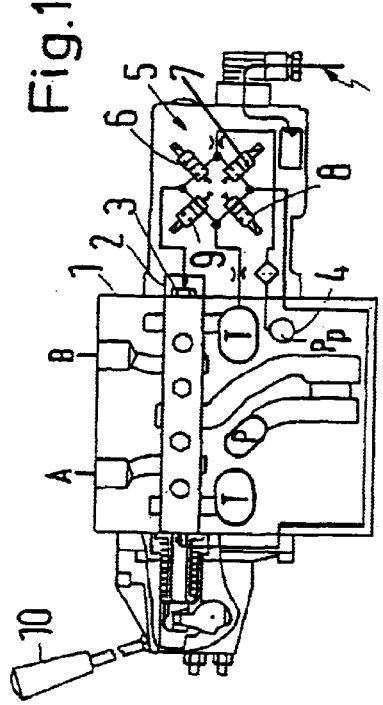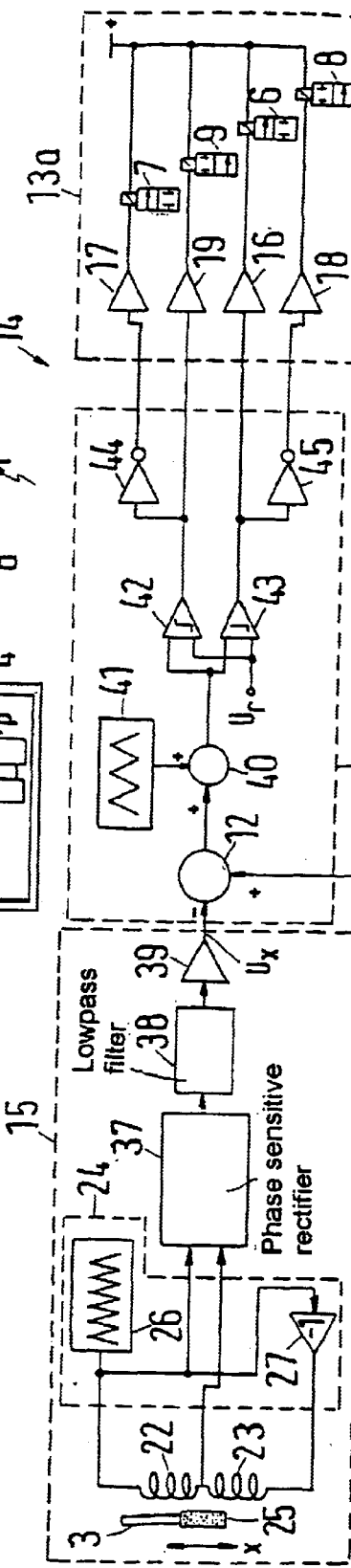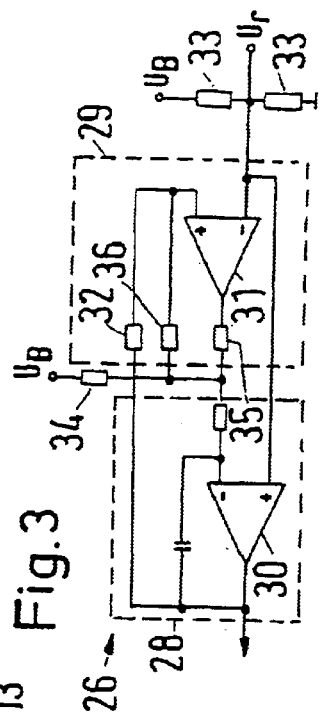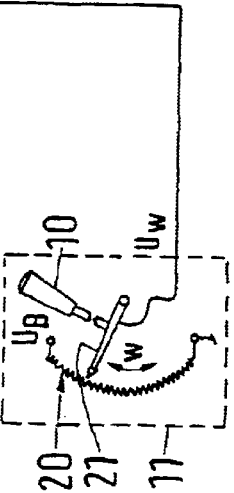

CONTROL DEVICE FOR THE POSITION OF A VALVE SLIDE

The invention concerns a control device for the position of a valve slide, with a d.c. voltage-operated set point transmitter, which produces a set point value proportional to the position of a control lever and the operating d.c. voltage, with an actual value transmitter operated with the same d.c. voltage as the set point transmitter, which produces an actual value signal proportional to the position of the valve slide and the operating d.c. voltage, the proportionality factors being equal to the dependence of the set point and actual value signals on the position of the valve slide or the position of the control lever, respectively, and on the operating d.c. voltage, and with a regulating device having a comparator, which regulating device makes the position of the valve slide follow the position of the control lever in dependence of a difference between the set point signal and the actual value signal detected by the comparator.

In a known, commercially available control device of this kind, the actual value transmitter and the set point transmitter are both made as potentiometers. Both potentiometers are connected to the same operating d.c. voltage and have the same transmission relation between inlet and outlet size. Therefore, they both produce a so-called "ratiometric" signal, so that changes of the operating d.c. voltage have the influence on the control deviation or control difference, respectively, detected by the comparator, and thus on the outlet side regulating signal of the regulating device, without requiring a stabilisation of the operating d.c. voltage, regardless if changes of the operating d.c. voltage caused by interferences or by different choice of the operating voltage must be balanced. As the valve slide is connected with the outlet of the potentiometer converting its position to the actual value signal, the frequent displacements of the valve slide caused by control processes submit the potentiometer to a relatively fast wear, the potentiometer additionally being influenced by the working fluid, for example oil, of the slide valve, for example in connection with insufficient sealing of the valve slide in the valve housing, for example in that the working fluid penetrates between the outlet and the resistor of the potentiometer, thus changing the contact resistance between those.

The invention is based on the task of providing a control device as mentioned in the introduction, in which the actual value transmitter has a longer life, though still having a relatively simple embodiment.

According to the invention, this task is solved in that the actual value transmitter converts the position of the valve slide touchfree into the actual value signal.

In this embodiment, the actual value transmitter works substantially wearless, so that it has a longer life. A contact resistance, like in a potentiometer, is not available.

Preferably it is provided that the actual value transmitter has two coils wound in opposite directions and arranged coaxially after each other, the coils being supplied through an a.c. voltage generator, and a magnet core being displaceable by the valve slide relative to both coils in their magnet field. This gives a simple embodiment of the actual value transmitter.

The a.c. voltage generator can be a sine generator. Preferably, however, it is a triangle generator. However, a triangle generator, enabling a "ratiometric" actual value signal in connection with the coils mentioned, is more simply designed.

This gives a more simple embodiment, when the two coils are connected in series, the a.c. voltage generator has a triangle pulse generator producing a one-sided triangle pulse and a transmission link with the transmission factor −1, and the outlet of the triangle pulse generator is connected direct with one and via the transmission link with the other connection of the series connection of the two coils.

In particular, it may be provided that the triangle pulse generator has an integrator and a Schmitt-trigger, each having an operation amplifier, that the outlet of the integrator forms the outlet of the triangle pulse generator and is connected with the comparison inlet of the Schmitt-trigger, that the outlet of the Schmitt-trigger is connected with the inlet of the integrator, that a reference connection of the integrator and of the Schmitt-trigger lies on a reference level corresponding to half of the operating d.c. voltage, and that the outlet of the Schmitt-trigger lies on the operating d.c. voltage via a resistor. This gives a particularly simple embodiment of the triangle pulse generator.

For this purpose, the connections of both coils can be connected with the comparator of the regulating device via a phase sensitive rectifier, a lowpass filter and an amplifier, to rectify the a.c.-signal, picked up at the coils, representing not only the amount (size), but also the direction, of the displacement of the valve slide, into a d.c. voltage signal, which also displays the position of the valve slide according to amount and direction and still is ratiometric, so that in the comparator of the regulating device it can be compared with a set point signal also displaying a ratiometric d.c. voltage signal. In this connection, the amplifier can ensure that the proportionality factors or the transmission coefficients, respectively, of both transmitters are equal.

In a simple manner—as usual—the set point transmitter can have a potentiometer, whose pick-up is connected with the comparator of the regulating device.

In the following, the invention and its embodiments are described in detail on the basis of drawings of a preferred embodiment of a control device according to the invention. The drawings show:

FIG. 1 a slide valve arrangement, whose valve slide position is optionally adjustable manually direct by means of a control lever or by means of the control device according to the invention FIG. 2 a block schematic diagram of the embodiment of a control device according to the invention and FIG. 3 a more detailed schematic diagram of a triangle pulse generator contained in the actual value transmitter of the control device according to FIG. 2.

The slide valve arrangement according to FIG. 1 has a housing 1 with a bore 2, in which a valve slide 3 is arranged to be axially displaceable in one direction or the other, so that a hydraulic working machine connected to the connections A and B of the housing 1 can be operated in one direction or the other by a pressure fluid, here oil. The pressure fluid from a pump 4, which is only shown schematically in the housing 1, in fact, however, is arranged outside the housing, is supplied via a bridge connection 5 of 4 solenoid valves 6, 7, 8 and 9, alternatingly to one side or the other of the valve slide 3, in dependence of the position of a control lever 10, as described in detail below by means of the FIGS. 2 and 3. T is the designation of the connections for the pressure fluid reservoir (Tank). P is a pump connection.

The position of the manually operated control lever 10 (also called "joystick") is converted by means of a set point transmitter 11 into a ratiometric set point signal $U_w$ and compared through a comparator 12 of the regulator 13 of a regulating device 14 with a ratiometric actual value signal $U_x$ showing the position of the valve slide 3. The actual value signal $U_x$ is the output signal of an actual value transmitter 15 measuring the position of the valve slide 3. In dependence of the amount and the direction of a control difference or control deviation determined by the comparator 12, the regulator 13, via an adjuster 13a of the regulating device 14, which has the solenoid valves 6 to 9 and belonging drivers 16, 17, 18 and 19, displaces the valve slide 3 in one direction or the other until the valve slide, at least approximately has assumed the position determined by the position of the control lever 10.

The set point transmitter 11 comprises a potentiometer 20 with a slip ring pick-up 21, whose position w is determined by the control lever 10. The potentiometer 20 comprises an ohmic resistor with the resistance value R. For the voltage picked up at the slip ring pick-up 21, creating the set point signal $U_w$, it then applies:

$$U_w = k_o \frac{U_B \cdot w}{R} = k_1 \cdot U_B \cdot w \quad (1)$$

$k_o \cdot w$ being equal to the resistance value between the slip ring pick-up 21 of the potentiometer 20 and the mass. Thus, the set point signal $U_w$ is proportional to both the position w of the control lever 10 and the operation d.c. voltage $U_B$, $k_1 = k_o/R$ creates the proportionality factor.

The actual value transmitter 15 converts the position x of the valve slide 3 touchless into the actual value signal $U_x$. For this purpose, the actual value transmitter 15 comprises two oppositely wound coils 22, 23, arranged coaxially behind each other, connected electrically in series and supplied through an a.c. voltage generator 24. Further, the actual value transmitter comprises a magnet core 25, which is rigidly connected with the valve slide 3, through this connection being displaceable relative to the two coils 22, 23 in their magnetic field.

The a.c. voltage generator 24 can be a sine generator. Preferably, however, it is made as a triangle generator. For this purpose, the a.c. voltage generator 24 comprises a triangle pulse generator 26 producing a one-sided triangle pulse and a transmission link 27 with the transmission factor −1. The outlet of the triangle pulse generator 26 is connected direct with one connection and via the transmission link 27 with the other connection of the series connection of the two coils 22, 23.

According to FIG. 3, the triangle pulse generator 26 comprises an integrator 28, here a Miller-integrator, and a Schmitt-trigger 29, each having an operation amplifier 30 and 31. The outlet of the integrator 28 forms the outlet of the triangle pulse generator 26, and is connected, via an ohmic resistor 32, with the comparing inlet of the Schmitt-trigger 29, here the non-reversing inlet (+) of the operation amplifier 31. A reference connection of the integrator 28, here the non-reversing inlet (+) of the operation amplifier 30, and a reference connection of the Schmitt-trigger 29, here the reversing inlet (−) of the operation amplifier 31, lie on a reference level $U_r$, which corresponds to half of the operation d.c. voltage Us. The reference level $U_r$ is picked up from the connecting point of two equal ohmic resistors 33, forming a voltage divider and lying in series at the operating d.c. voltage $U_B$. The outlet of the Schmitt-trigger 29 lies over an ohmic resistor 34 on the operation d.c. voltage $U_B$, and the outlet of the operation amplifier 31 is connected via an outlet resistor 35 and a feedback resistor 36 with the non-reversing inlet (+) of the operation amplifier 31. The relation of the resistance values of the resistors 32 and 36 is selected to correspond to the desired amplitude of the triangle pulses. In its end step the operation amplifier 31 comprises a transistor with open collector, which, after being switched off, is "pulled high" again via the resistor 34. The outlet signal of the Schmitt-trigger 29 is a square wave voltage, whose square wave pulses are, in dependence of their polarity in one direction or the other, integrated through the integrator 28, the polarity of the outlet signal of the Schmitt-trigger 29 changing every time the outlet signal of the integrator 28 exceeds or goes below the reference level $U_r$. As the reference level $U_r$ changes in dependence of the operation d.c. voltage $U_B$, also the amplitude of the triangle pulse on the outlet of the triangle pulse generator 26 depends on the operation d.c. voltage $U_B$, that is, an increase in the operation d.c. voltage $U_B$ will also cause an increase of the reference level $U_r$ and thus also of the amplitude of the triangle pulse proportional to the operation d.c. voltage $U_B$, and vice versa.

Instead of the triangle pulse generator 26, also a sine generator could be used, however, the shown embodiment of the triangle pulse generator 26 would be simpler than that of a sine generator.

Further, the triangle pulse of the triangle pulse generator 26 represents a pulsating direct voltage, which through a reversion of the poles in the transmission link 27 is converted to a counter pulsating triangle signal with the transmission factor −1.

In dependence of the position of the valve slide 3 and thus the magnet core 25, the impedances of the two coils 22, 23 change: When the magnet core 25 is moved in one direction or the other in relation to the two coils 22, 23, from the shown centre position, the impedance of one coil increases, whereas the impedance of the other coil decreases. In this connection, an a.c. voltage with an approximately triangle-shaped course occurs at the connecting point of the two coils 22, 23, the amplitude of which voltage is proportional to the position x of the valve slide 3, and whose phase position depends on the direction of the displacement of the magnet core 25 in relation to the coils 22, 23.

The connections of the two coils 22, 23 are connected with the comparator 12 of the control device 14 via a phase sensitive rectifier 37, a lowpass filter 38 connected in series with the rectifier and smoothing the rectified voltage, and an amplifier 39. The comparator 12 therefore also receives a ratiometric actual value signal $U_x$ through the actual value transmitter 15, which signal is proportional to the position x of the valve slide 3 and whose polarity sign corresponds to the direction of the displacement of the valve slide 3. Thus, it also applies for the actual value signal that $$U_x = k_2 \cdot U_B \cdot X \quad (2)$$

Also in this case, the actual value signal $U_x$ is proportional to the operating d.c. voltage $U_B$ and the position x of the valve slide 3, the proportionality factor $k_2$ corresponding to the product of the transmission factors of the series connected links 37, 38 and 39 in the stationary (transient) state. Through a corresponding selection of these transmission factors, particularly the amplification factor of the amplifier 39, the proportionality factor $k_2$ can be chosen so that it is equal to the proportionality factor $k_1$. Each position of the control lever 10 thus corresponds to an actual value signal $U_x$, equally large with regard to amount and polarity sign, when the valve slide 3 is in the nominal state and thus the output signal of the comparator 12, that is the control difference or control deviation, is approximately zero. A change of the operating d.c. voltage $U_B$ therefore has practically no influence on the output signal of the comparator 12.

Further, the regulator 13, which also may be called a controller, comprises a summing link 40 and a triangle pulse generator 41, which produces a bi-directional or direction-changing triangle pulse, that is, an alternating signal with triangle-shaped course, which through the summing link 40 is superimposed on the output signal of the comparator 12. The output signal of the summing link 40 therefore has an average value, which is proportional to the output signal of the comparator with regard to amount and polarity sign. The outlet of the summing link 40 is connected with the cormparison inlet of Schmitt triggers 42 and 43 contained in the controller. The reference inets of the Schmitt triggers 42 and 43 are commonly connected with the central.pick-up of the voltage divider made up of the resistors 33 (FIG. 3), that is, they both lie on the same reference potential $U_r$ than the reference inlet of the Schmitt trigger 29. When the outlet signal of the summing link 40 exceeds the reference potential $U_r$, each of the Schmitt triggers 42, 43 produce a binary 1-signal. If, however, the outlet signal of the summing link 40 goes below the reference potential $U_r$, they produce a 0-signal. The outlet signals of the Schmitt triggers 42 and 43 are firstly led direct via the drivers 16, 19 to the magnetic windings of the solenoid valves 6 and 9 and secondly via inverting steps (NOT gate) 44 and 45 and the drivers 17 and 18 in series with them to the magnetic windings of the solenoid valves 7 and 8. The outlet signals of the Schmitt triggers 42 and 43 are pulse width modulated in dependence of the size of the outlet signal of the summing link 40, so that also the. relation between opening and closing duration. of the solenoid valves 7 to 9 is pulse width modulated in accordance with the duty cycle of the outlet signals of the Schmitt triggers 42 and 43.

When a 1-signal appears on the outlets of the Schmitt triggers 42 and 43, the solenoid valves 6 and 9 are switched from the position shown in FIG. 1, that is, the solenoid valve 6 opens and the solenoid valve 9 closes. As opposed to this, the solenoid valves 7 and 8 receive a 0-signal, so that they maintain the positions shown in FIG. 1, solenoid valve 7 being closed and solenoid valve 8 being open. The pump 4-would then, via the open solenoid valve 6, act upon the valve slide 3 by means of a pressure fluid on the side shown to the right in FIG. 1, thus displacing the valve slide to-the left, the pressure fluid flowing back to tank from the other side of the valve slide 3 via the open solenoid valve 8. When, on the other hand, the output signal of the summing link 40 gets lower than the reference potential $U_r$, 0-signals appear on the outlets of the Schmitt-triggers 42 and 43, which cause that the solenoid valves 7 and 9 are opened and the solenoid valves 6 and 8 are closed, so that the pressure fluid from the pump 4 flows via the solenoid valve 7 to the left side of the valve slide 3, displaces it to the right in FIG. 1, flows out on the right side of the valve slide 3 and from there back to the tank via the solenoid valve 9.

Due to the pulse width modulation of the opening and closing times of the solenoid valves 6 to 9, also the valve slide 3 assumes a position in the middle, which corresponds to the position of the control lever 10 or the setting of the set point signal $U_w$.

Different variations of the embodiment shown, still being within the scope of the invention, could be that the controller 13 was made as continuously working controller and that also the adjuster 13a was continuously working, the solenoid valves also being continuously working and being replaceable by two solenoid valves.

If required, the control lever 10 can, in case of a failure of the control device, be brought to engagement with the valve slide 3 by means of a control cam, to make a direct manual adjustment.

What is claimed is:

1. Control device for the position of a valve slide having a set point transmitter operated by an operating d.c. voltage, the set point transmitter producing a set point signal proportional to the position of a control lever and the operating d.c. voltage, and having an actual value transmitter operated with the same operating d.c. voltage as the set point transmitter, the actual value transmitter producing an actual value signal proportional to the position of the valve slide and the operating d.c. voltage, the actual value signal for the valve slide having a proportionality factor dependent on the position of the valve slide and on the operating d.c. voltage and the set point signal for the control lever having a proportionality factor dependent on the position of the control lever and on the operating d.c. voltage, and having a regulating device having a comparator, which regulating device makes the position of the valve slide follow the position of the control lever in dependence on a difference between the set point signal and the actual value signal detected by the comparator, and in which the actual value transmitter converts the position of the valve slide touchfree into the actual value signal.

2. Control device according to claim 1, in which the actual value transmitter has two coils wound in opposite directions and arranged coaxially, the coils being supplied through an a.c. voltage generator, and a magnet core being displaceable by the valve slide relative to both coils in their magnet field.

3. Control device according to claim 2, in which the a.c. voltage generator is a triangle generator.

4. Control device according to claim 3, in which the two coils are connected in series, the a.c. voltage generator has a triangle pulse generator producing a one-sided triangle pulse and a transmission link with the transmission factor–1, and the triangle pulse generator has an outlet which is connected direct with one and via a transmission link with the other connection of the series connection of the two coils.

5. Control device according to claim 4, in which the triangle pulse generator has an integrator and a Schmitt-trigger, each having an operation amplifier, the integrator has an outlet which forms an outlet of the triangle pulse generator and is connected with a comparison inlet of the Schmitt-trigger, the Schmitt-trigger having an outlet which is connected with the inlet of the integrator, a reference connection of the integrator and the Schmitt-trigger lies on a reference level corresponding to half of the operating d.c. voltage, and the outlet of the Schmitt-trigger lies on the operating d.c. voltage via a resistor.

6. Control device according to claim 2, in which both coils are connected with the comparator of the regulating device via a phase sensitive rectifier, a lowpass filter and an amplifier.

7. Control device according to claim 1, in which the set point transmitter has a potentiometer having a pick-up connected with the comparator of the regulating device.

* * * * *